Aug. 21, 1934.　　　M. L. HUNKER　　　1,971,220
GALVANIZING MACHINE
Filed May 16, 1931　　　6 Sheets-Sheet 1

Inventor

M. L. Hunker

By Frease and Bishop
Attorneys

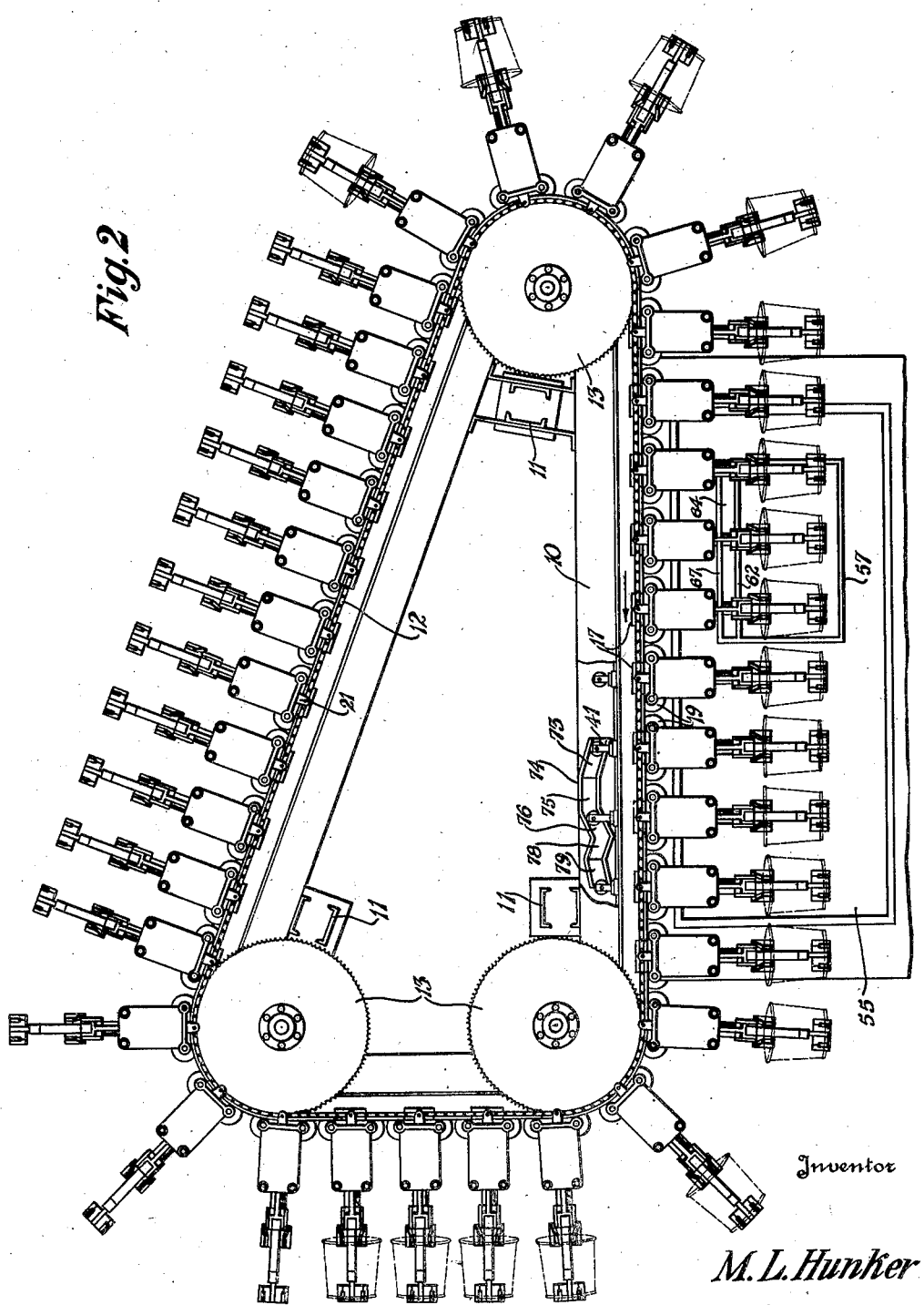

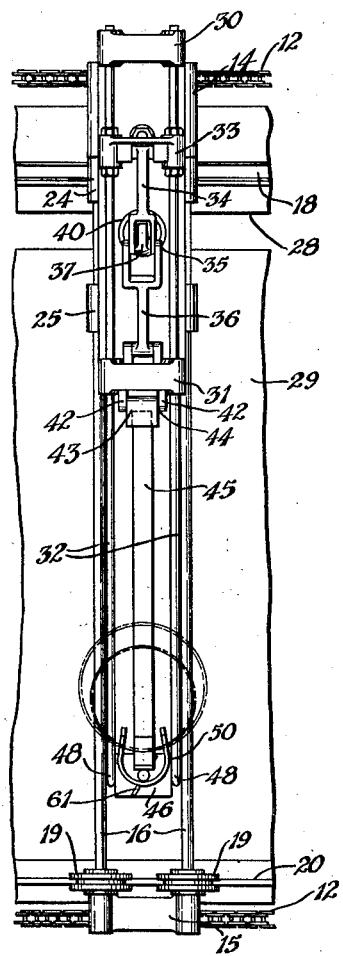

Aug. 21, 1934.   M. L. HUNKER   1,971,220
GALVANIZING MACHINE
Filed May 16, 1931   6 Sheets-Sheet 5

Inventor
M. L. Hunker
By Frease and Bishop
Attorneys

Aug. 21, 1934.                M. L. HUNKER                1,971,220
                           GALVANIZING MACHINE
                   Filed May 16, 1931       6 Sheets-Sheet 6

Inventor

M. L. Hunker

By Frease and Bishop  Attorneys

Patented Aug. 21, 1934

1,971,220

UNITED STATES PATENT OFFICE 1,971,220

GALVANIZING MACHINE

Martin L. Hunker, Dover, Ohio, assignor to The Reeves Manufacturing Company, Dover, Ohio, a corporation of Ohio Application May 16, 1931, Serial No. 537,871

16 Claims. (Cl. 91—12.6)

The invention relates to apparatus for coating pails, buckets and similar articles with zinc, tin or other coating materials.

Applicant is familiar with the galvanizing machines made in accordance with Carroll Patent No. 1,787,141 and while said machines operate satisfactorily to coat the articles, the present improvement contemplates the provision of a machine which will operate more rapidly than the Carroll machine, the object of the present improvement being to provide a machine in which the pails, or other articles to be coated, may be mounted more closely together than is possible in the Carroll structure.

Another and very important object of the improvement is to provide means for tilting each pail with open end downward as it is withdrawn from the molten coating metal whereby all of the metal will be poured from the pail as it emerges from the tank, thus minimizing the formation of oxide upon the surface of the coating material.

Another object of the improvement is to provide a machine for this purpose including a superposed pair of endless chains arranged to operate in parallel planes, a plurality of vertical guides being connected at opposite ends to the chains and vertically slidable carriers being mounted upon the guides.

Another object is to provide a galvanizing pot or tank adjacent to the endless chains, a flux box being located above the molten metal in the tank, means being provided for slidably moving each carrier, upon its guide, downward through the flux box, then laterally through the molten metal in the tank and upward out of the same.

A still further object of the improvement is to provide a tilting frame at the lower end of each carrier for holding a pail or other article to be coated, a flexible bar being connected to said frame for tilting the same in opposite directions, cam means being provided in the apparatus for flexing the bar in either direction as desired.

A still further object of the improvement is to provide a toggle link arrangement for further flexing the flexible bar to the desired extent after it has been started in the right direction by the cam means.

Figure 1:
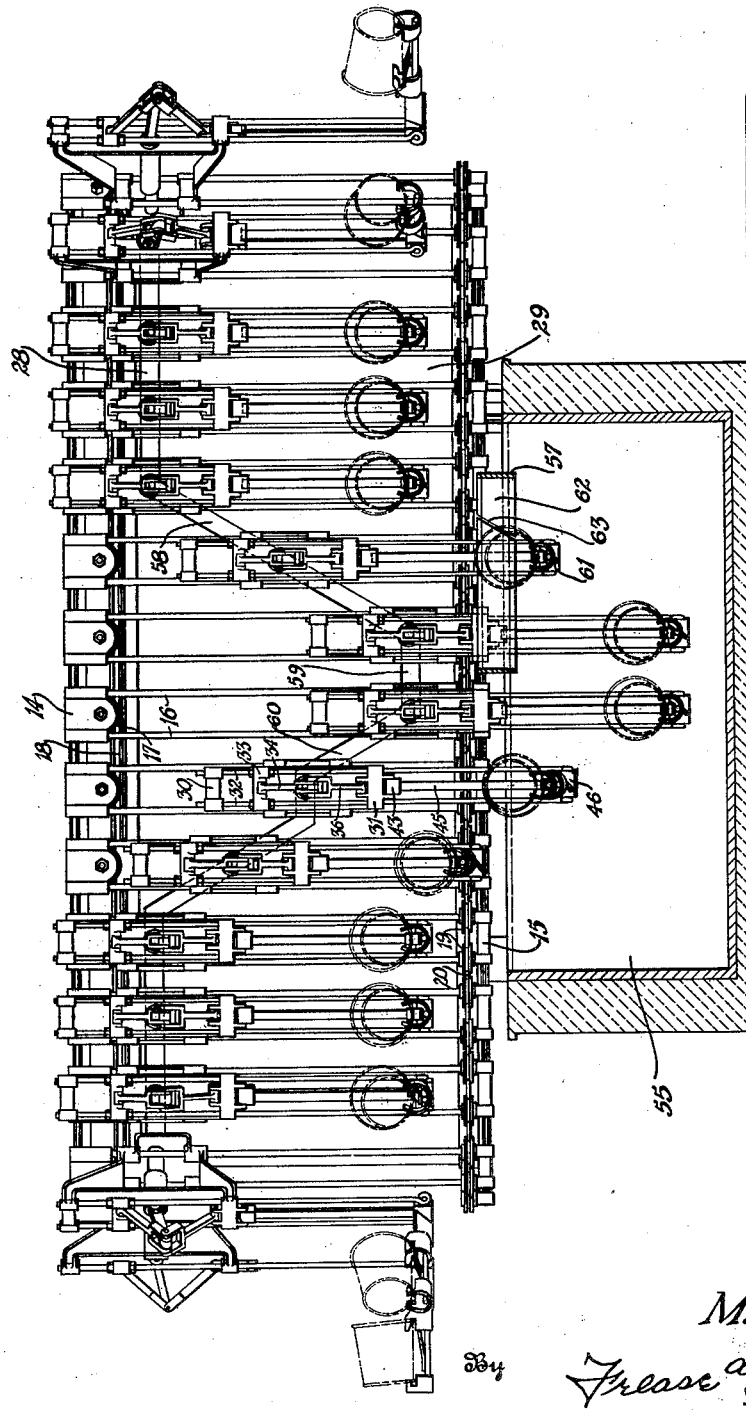
Figures 3, 4:
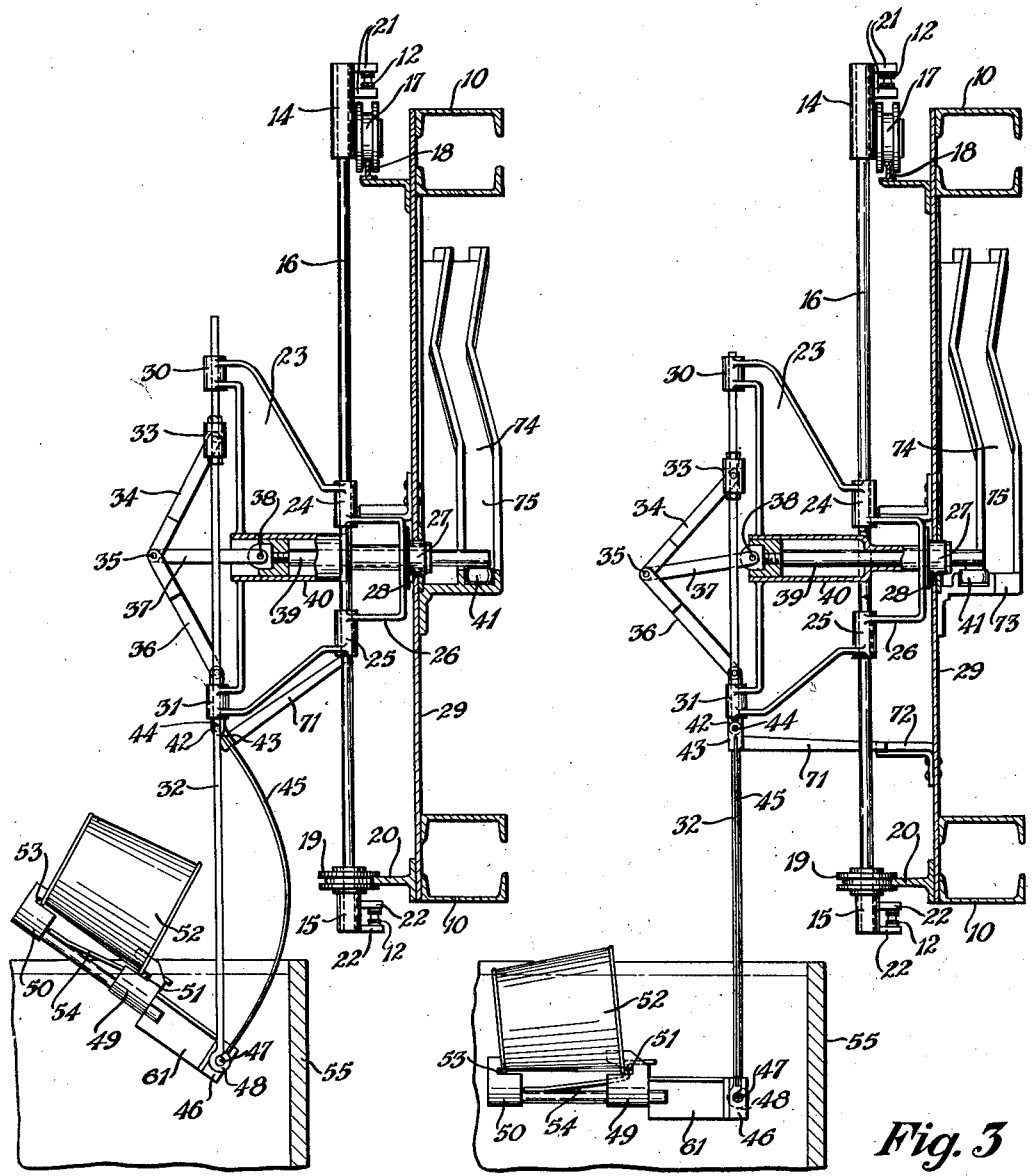
Figure 7:
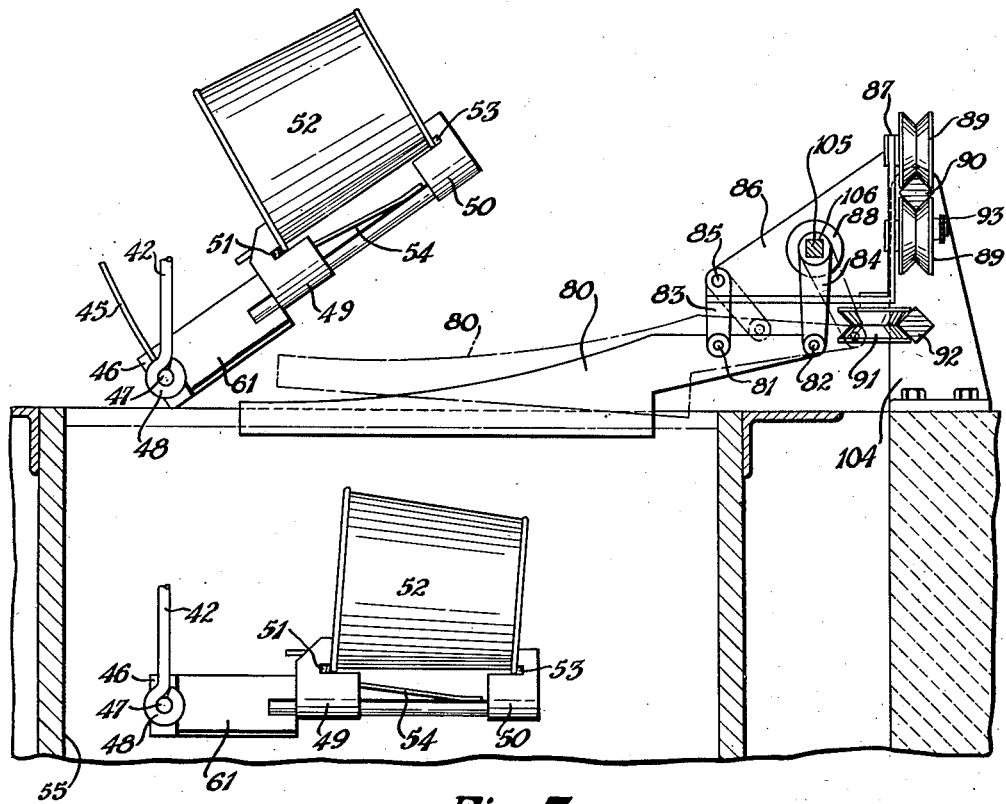
Figure 8:
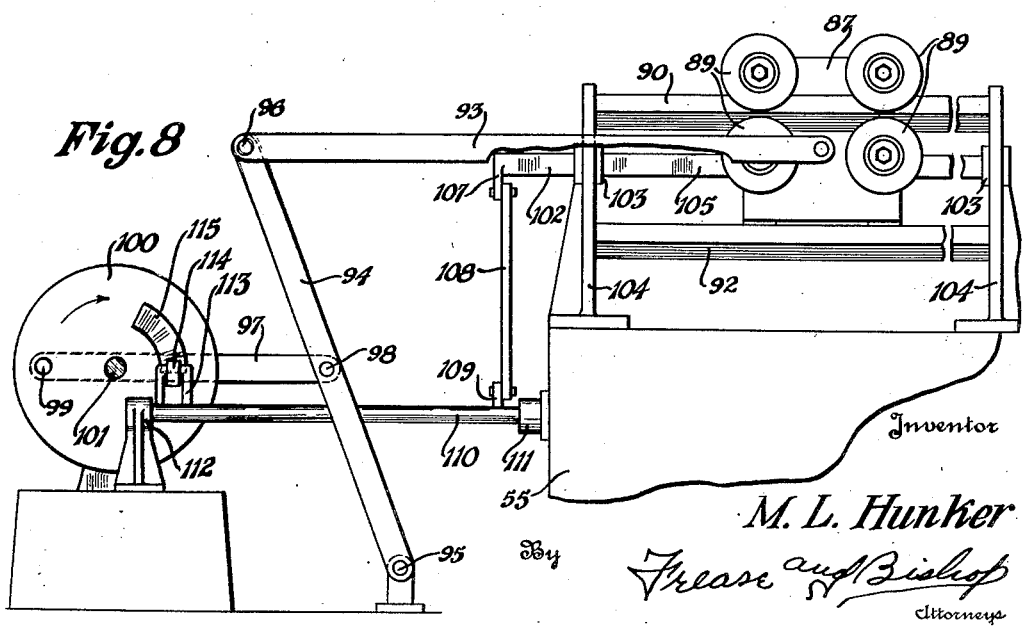
Figure 14:
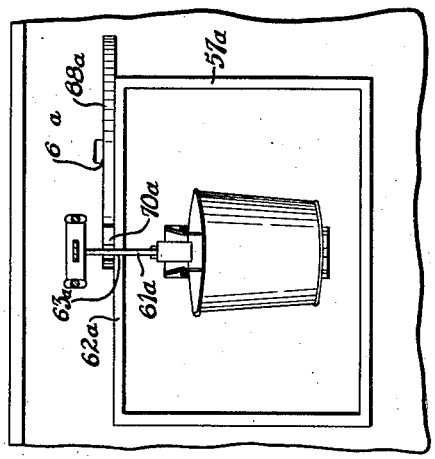
Figure 13:
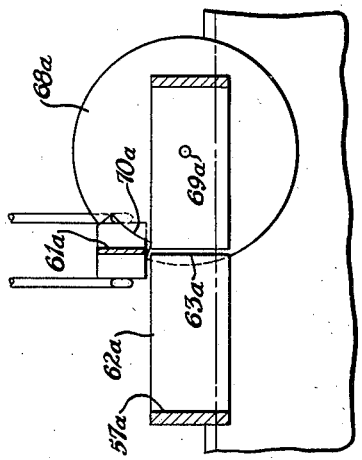
Figure 12:
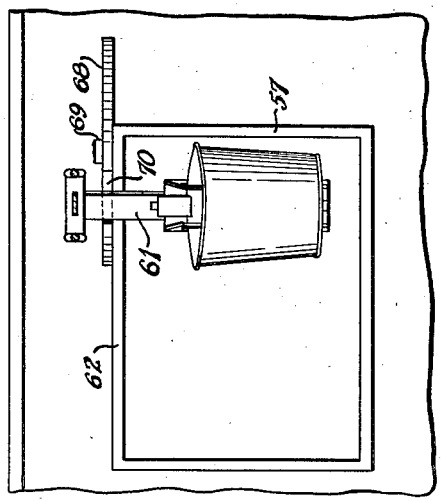
Figure 11:
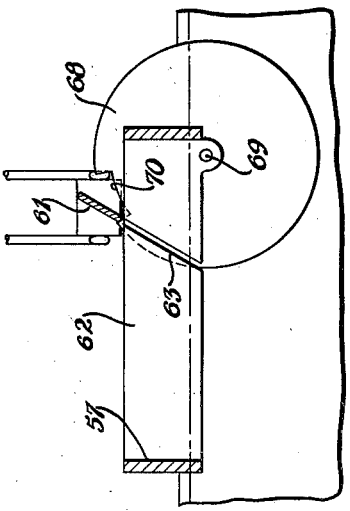
Figure 9:
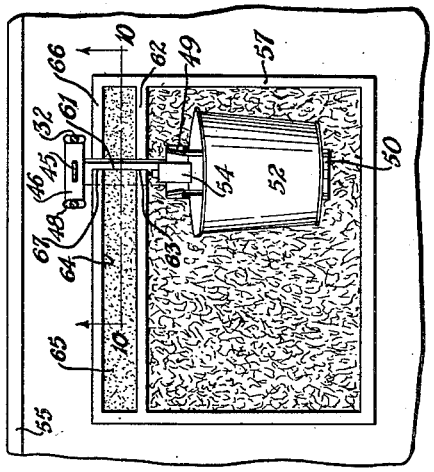
Figure 10:
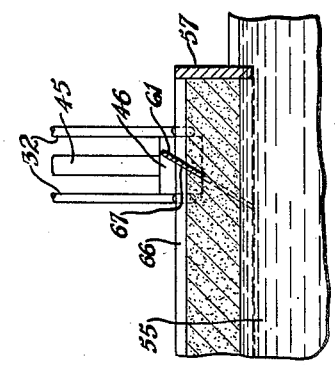

The above, together with other objects which will be apparent from the accompanying drawings and the following description or which will be later pointed out, may be attained by constructing the machine in the manner illustrated in the drawings, in which Figure 1 is a side elevation of the improved galvanizing machine showing the galvanizing tank and flux box in section;

Fig. 2, a top plan view of the same;

Fig. 3, an enlarged detail sectional view showing one of the vertical guides and the vertically movable carrier thereon in the position when the pail is just starting to emerge from the galvanizing tank, the tilting frame which carries the pail being shown in the normal or horizontal position;

Fig. 4, a similar view showing the frame tilted rearward to entirely withdraw the pail from the galvanizing tank and to drain the molten metal from the pail back into the tank;

Fig. 5, a similar view showing the carrier raised up to the normal position and the tilting frame tilted forward to drain the molten metal from the chime of the pail;

Fig. 6, a front elevation of one of the guides and the carrier and tilting frame thereon showing the same in the normal position;

Fig. 7, a transverse sectional view through the galvanizing tank showing the skimmer for removing oxide from the top of the molten metal before each pail emerges therefrom;

Fig. 8, an elevation of the mechanism for operating the skimmer;

Fig. 9, a top plan view of the flux box;

Fig. 10, a section on the line 10—10, Fig. 9;

Fig. 11, a section through the flux box showing a modified form of gate;

Fig. 12, a plan view of the same;

Fig. 13, a view similar to Fig. 11 showing a further modification of the flux gate; and Fig. 14, a plan view of the same.

Similar numerals refer to similar parts throughout the drawings.

The improved machine includes a frame shown generally at 10, which may be of substantially triangular form if desired, as best shown in Fig. 2, this frame being supported upon uprights 11. Endless conveyor means for carrying a plurality of pails in a horizontal path preferably includes a pair of spaced endless chains 12 are arranged to be operated in horizontal planes around the frame near the top and bottom thereof, the chains being located around sprocket wheels 13 which may be suitably journaled upon the frame in any usual and well known manner, any suitable means being provided for driving one or more of the sprockets so as to move the chains in the direction of the arrow shown in Fig. 2.

A plurality of vertically disposed carriages are carried by the chains, each carriage including an upper casting 14 and a lower casting 15, a spaced pair of vertical guide rods 16 being connected at opposite ends to the castings 14 and 15.

A flanged wheel 17, located in a vertical plane, is carried by each upper casting 14 and rolls upon the track rail 18, supported from the main frame of the machine, for the purpose of supporting the weight of the carriages and the structure carried thereby.

Horizontally disposed wheels 19 may be journaled upon the lower portions of the guide rods 16 and roll upon the track rail 20, also supported upon the main frame of the machine, for the purpose of maintaining the carriages in vertical position.

The upper casting 14 may be provided, upon its inner or rear side, with spaced lugs 21 for connecting the carriage to the upper chain 12 and the lower casting 15 may be provided with similar lugs 22 for connecting the carriage to the lower chain 12. With both chains driven in unison the carriages will thus be carried around the machine, remaining in vertical position throughout the operation.

A carrier is mounted for vertical movement upon each of the carriages above described, said carrier including a casting shown generally at 23 provided with spaced upper and lower pairs of bearing guides 24 and 25 respectively, slidably mounted upon the guide rods 16. A rearwardly disposed yoke portion 26 may be formed integral with the casting 23, a roller 27 being journaled upon the rear side of said yoke and arranged to travel within a slot 28 in the plate 29 which is fixed to the upper and lower frame members 10 and is located entirely around the same.

The carrier head 23 is provided with the spaced upper and lower bearings 30 and 31 respectively, through which are slidably mounted a pair of vertically disposed rods 32. A crosshead 33 is connected to the rods 32 at a point spaced from the upper ends thereof and one of a pair of toggle links 34 is pivotally connected at its upper end to said crosshead. The opposite end of this link is pivotally connected, as at 35, to the other toggle link 36, the lower end of which is pivotally mounted upon the bearing member 31.

A link 37 is pivotally connected at one end to the pivotal connection 35 of the toggle links, the other end of said link being pivoted, as at 38, to a plunger 39 mounted for reciprocation within the cylinder 40, forming a part of the carrier head 23. A roller 41 is mounted upon the under side of the plunger 39 at the rear end portion thereof, beyond or inside of the plate 29.

A spaced pair of depending lugs 42 may be formed upon the under side of the bearing member 31, a block 43 being pivoted between said lugs as indicated at 44. The upper end of a flexible or spring bar 45 is fixed to said block, the lower end thereof being fixed to the rear or inner end portion of the tilting frame 46 which is pivotally mounted upon the rod 47 journaled in the eyes 48 formed at the lower ends of the rods 32.

Thus as the toggle links 34 and 36 are operated by inward movement of the plunger 39, the rods 32 are slidably moved upward through the bearings 30 and 31 and the spring bar 45 is flexed to tilt the frame 46 as will be hereinafter described.

The frame 46 carries a spaced pair of preferably U-shaped brackets 49 and 50, the bracket 49 having slots 51 cut therein to receive the upper or open end of a pail 52 or the like while the bracket 50 may be provided with the slots or notches 53 to receive the chime portion of the pail to be coated.

A leaf spring 54 may be carried by the tilting frame, the free end portion thereof being arranged to engage the upper or open end portion of the pail to retain the same in position upon the brackets 49 and 50. By depressing the free end portion of the spring 54, the pail may be released from engagement with the brackets upon the tilting frame.

At the front side of the machine a galvanizing tank 55, of usual construction, is located below the main frame and adapted to contain the molten zinc or other material for coating the articles. A flux box 57 is located in the upper portion of the galvanizing tank at the point where the pails, or other articles to be coated, enter the same.

At a point above the galvanizing tank the slot 28 in the plate 29 is inclined downward at an angle as at 58 to a point near the bottom of the plate, then substantially horizontal for a distance as at 59 and then upward as at 60. As each carriage reaches the point where the slot in the plate is inclined downward as at 58, the roller 27 upon the sliding head 23 travels downward in said inclined portion of the slot, moving the carrier, and the tilting frame carrying the pail, downward, passing the pail through the flux box 57 and into the spelter or other coating material below the same.

The inner portion of the tilting frame 46 comprises an angular blade 61 located at the same angle as the slot 58 and the rear wall 62 of the flux box is provided with a slot 63 located at the same angle and adapted to permit the angular blade 61 to pass therethrough.

For the purpose of preventing the flux from flowing through said slot onto the surface of the molten metal, means is provided for sealing the slot at all times. As shown in Figs. 9 and 10, this means may comprise a separate compartment 64 located in back of the rear wall 62 of the flux box and adapted to be filled with sand or the like, as indicated at 65, the rear wall 66 of this compartment being provided with a slot 67 inclined at the same angle as the slot 63, so as to permit the angular blade 61 of the tilting frame to pass through both slots simultaneously.

If desired, a modified form of flux gate may be provided, such as shown in Figs. 11 and 12. In this construction the flux box 57 may be substantially as above described, the rear wall 62 being provided with the inclined slot 63. In order to seal this slot at all times to prevent the flux from passing through the same, a flux gate in the form of a disk 68 may be journaled as at 69 upon the rear wall 62 of the flux box and may be driven in unison with the movement of the carriers by any suitable means not shown. This disk is provided in its periphery with a notch 70 adapted to receive the angular blade 61 of the tilting frame, the disk being so positioned that it overlaps the angular slot 63, as shown in Fig. 11, sealing the same at all times.

A modification of this disk flux gate is shown in Figs. 13 and 14 in which the carriage may be adapted for straight vertical movement through the flux box and into the galvanizing tank rather than the angular movement above shown and described. In this case the tilting frame may be provided with a vertical blade 61a adapted to pass down through the vertical slot 63a in the back wall 62a of the flux box 57a. The disk 68a is journaled as at 69a upon the back wall of the flux box and provided with the notch 70a to receive the blade 61a of the tilting frame, the disk overlapping the slot 63a so as to seal the same in the manner above described with reference to the gate shown in Figs. 11 and 12.

In the operation of the machine, the pails or other articles to be coated may be loaded upon the tilting frames at the right-hand side of the machine as viewed in Figs. 1 and 2. In this position the carriers are in the raised or normal position and the tilting frames are also in the normal or horizontal position. Each carrier remains in this position until the inclined slot 58 is reached, at which time the roller 27 moves downward through the angular slot 58, sliding the carrier downward upon the guide rods 16 and passing the tilting frame and the pail carried thereby down through the flux box and into the molten coating material.

After the roller 27 reaches the lower end of the inclined slot 58 it travels through the horizontal slot 59, holding the carriage in lowered position, and then passes upward through the inclined slot 60, raising the carriage to withdraw the pail from the coating material. Thus each frame 46 continuously supports a pail from the time it is placed upon the conveyer before being coated, until it is removed from the conveyer after the coating operation is completed.

Means is provided for tilting the open end of the pail downward as it emerges from the coating material so that all of the molten metal will be discharged from the pail as it emerges from the tank.

The object for discharging all of the coating metal from the pail at this point instead of pouring it from the pail after it has been raised out of the tank is to prevent excessive oxidation of the coating material which would otherwise occur. This oxide remains on top of the molten coating metal and is, of course, detrimental to the coating upon pails subsequently removed from the tank.

As the pail starts to emerge from the coating metal, the finger 71 upon the pivoted block 43 contacts with the cam plate 72, fixed upon the side plate 29, flexing or bowing the spring bar 45 slightly inward. At the same time, the roller 41 is moved backward through the rearwardly or inwardly inclined portion 73 of the cam track 74, pulling the plunger 39 inward and through the link 37 operating the links 34 and 36 to raise the rods 32, further flexing the spring bar 45 and tilting the frame 46 as shown in Fig. 4. The pail is thus tilted and raised out of the molten coating metal in the position shown in Fig. 4 so that all of the coating metal is poured from the pail as it emerges from the tank.

As the roller 41 continues to move through the straight portion 75 of the cam track, the pail is held tilted in this position. As the pail moves upward the roller passes into the forwardly or outwardly inclined portion 76 of the cam track, tilting the frame 46 back to the normal or horizontal position.

On further upward movement of the carrier, the finger 71 engages the under side of the cam plate 77, flexing the spring bar 45 outward and at the same time the roller 41 moves into the outwardly or rearwardly inclined portion 78 of the cam track, tilting the frame 46 outward or downward, moving the pail into the position shown in Fig. 5 to drain any surplus coating metal from the chime of the pail.

The roller 41 then engages the outwardly inclined portion 79 of the cam track, moving the tilting frame 46 back to the horizontal position as the upper end of the inclined slot 60 is reached, the carrier then moving horizontally to the left, as viewed in Fig. 1, with the parts in the normal position.

Any suitable means may be provided for removing the coated pails from the frames at the left-hand side of the machine and conveying them away from the machine, or if desired, the pails may be removed manually from the frames by releasing the springs 54.

For the purpose of removing the oxide from the surface of the molten metal before each pail emerges therefrom, a skimmer is provided which is illustrated in detail in Figs. 7 and 8. This skimmer includes a blade 80 pivotally carried at its outer end portion, as at 81 and 82, upon the depending link 83 and the rocker arm 84 respectively. This link is pivotally mounted at its upper end, as at 85, upon an angular bracket 86 upon the carriage 87 and the rocker arm 84 is journaled in a bearing 88 carried by the bracket 86.

The carriage 87 is provided with the vertical rollers 89 engaging the track 90 and with the horizontal rollers 91 engaging the track 92 and is adapted to be reciprocated by means of a link 93 operated by any suitable mechanism such for instance as illustrated in Fig. 8.

For this purpose, a lever 94, fulcrumed at its lower end as at 95, may be pivotally connected at its upper end, to the outer end of the link 93 as shown at 96. This lever may be oscillated by a connecting rod 97 pivotally connected to the lever 94, intermediate the ends thereof as at 98, the opposite end of the connecting rod being pivoted upon the wrist pin 99 carried upon the disk or wheel 100. This wheel is mounted upon a shaft 101 which may be rotated, in the direction of the arrow shown in Fig. 8, by any suitable power means.

For the purpose of raising and lowering the skimmer blade 80, a rocker shaft 102 is journaled through bearings 103 in the brackets 104, which support the tracks 90 and 92. This rocker shaft has a squared portion 105 slidably received in a square socket 106 in the rocker arm 84 and the outer end of the shaft is provided with an angular arm 107 to the end of which is pivotally connected the upper end of a link 108, the lower end of said link being pivotally connected to a similar arm 109 upon the rocker shaft 110 which is journaled in suitable bearings 111 and 112 mounted upon any suitable stationary portion of the apparatus.

An arm 113 is fixed upon the shaft 110 and provided with a roller 114 or the like adapted to be engaged by a cam 115 upon the face of the disk 100.

As the disk 100 is rotated, the connecting rod 97, lever 94 and link 93 will operate to reciprocate the carriage 87 upon the tracks 90 and 92 and the rocker shaft 110 will be rocked, by means of the cam 115, and through the link 108 will rock the shaft 102, which through the rocker arm 84 and link 83 will raise the skimmer blade 80, as shown in dot and dash lines in Fig. 7, as the same is moved in one direction, then lowering the blade, as shown in full lines in said figure, so that the lower edge of the same is submerged below the surface of the molten coating metal in the tank.

The blade is then moved in the opposite direction, in this position, by the movement of the carriage, skimming the oxide from the surface of the molten metal just before each pail emerges therefrom.

I claim:

1. Apparatus for coating metal pails and the like including a tank of coating material, endless conveyer means, a plurality of flexible carriers upon the conveyer means for carrying pails in a horizontal path adjacent to the tank, means for successively moving each pail into and out of the coating material, and means for flexing each of said flexible carriers for tilting the open end of the pail downward while it is being withdrawn from the coating material.

2. Apparatus for coating metal pails and the like including a tank of coating material, endless conveyer means, a plurality of flexible carriers upon the conveyer means for carrying pails in a horizontal path adjacent to the tank, means for successively moving each pail into and out of the coating material, means for flexing each of said flexible carriers for tilting the open end of the pail downward while it is being withdrawn from the coating material, and means for flexing each of said flexible carriers in the opposite direction for tilting the pail in the opposite direction after it is withdrawn from the coating material.

3. Apparatus for coating metal pails and the like including a tank of coating material, a flexible carrier, a frame upon the carrier adapted to continuously support a pail to be coated, means for moving the carrier to move the pail into and out of the coating material, and means for flexing the carrier for moving the frame to tilt the open end of the pail downward while it is being withdrawn from the coating material.

4. Apparatus for coating metal pails and the like including a tank of coating material, a flexible carrier, a frame upon the carrier adapted to continuously support a pail to be coated, means for moving the carrier to move the pail into and out of the coating material, means for flexing the carrier for moving the frame to tilt the open end of the pail downward while it is being withdrawn from the coating material, and means for flexing the carrier in the opposite direction for moving the frame to tilt the pail in the opposite direction after it is withdrawn from the coating material.

5. Apparatus for coating metal pails and the like including a tank of coating material, a flexible carrier, a tilting frame upon the carrier adapted to continuously support a pail to be coated, means for moving the carrier to move the pail into and out of the coating material, and means for flexing the carrier for tilting the frame to tilt the open end of the pail downward while it is being withdrawn from the coating material.

6. Apparatus for coating metal pails and the like including a tank of coating material, a flexible carrier, a tilting frame upon the carrier adapted to continuously support a pail to be coated, means for moving the carrier to move the pail into and out of the coating material, means for flexing the carrier for tilting the frame to tilt the open end of the pail downward while it is being withdrawn from the coating material, and means flexing the carrier in the opposite direction for tilting the frame to tilt the pail in the opposite direction after it is withdrawn from the coating material.

7. Apparatus for coating metal pails and the like including a tank of coating material, a plurality of carriages, means for moving the carriages in a horizontal path adjacent to the tank, a carrier vertically movable on each carriage and adapted to support a pail to be coated, means for moving each carrier downward and upward upon its carriage to move the pails into and out of the coating material, and means for tilting the open end of each pail downward while it is being withdrawn from the coating material.

8. Apparatus for coating metal pails and the like including a tank of coating material, a plurality of carriages, means for moving the carriages in a horizontal path adjacent to the tank, a carrier vertically movable on each carriage and adapted to support a pail to be coated, means for moving each carrier downward and upward upon its carriage to move the pails into and out of the coating material, means for tilting the open end of each pail downward while it is being withdrawn from the coating material, and means for tilting each pail in the opposite direction after it is withdrawn from the coating material.

9. Apparatus for coating metal pails and the like including a carrier, a frame pivotally mounted upon the carrier and adapted to carry a pail to be coated, a spring bar on the carrier operatively associated with the frame, and means for flexing the spring bar to tilt the frame.

10. Apparatus for coating metal pails and the like including a carrier, a rod slidably connected to the carrier, a frame pivotally mounted upon the rod and adapted to carry a pail to be coated, a spring bar on the carrier operatively associated with the frame, and means for slidably moving said rod to flex the spring bar and tilt the frame.

11. Apparatus for coating metal pails and the like including a carrier, a rod slidably connected to the carrier, a frame pivotally mounted upon the rod and adapted to carry a pail to be coated, a spring bar on the carrier operatively associated with the frame, means for flexing the spring bar in either direction, and means for slidably moving the rod to further flex the spring bar and tilt the frame.

12. Apparatus for coating metal pails and the like including a carrier, a rod slidably connected to the carrier, a frame pivotally mounted upon the rod and adapted to carry a pail to be coated, a spring bar on the carrier operatively associated with the frame, a finger upon the spring bar, cam means adapted to contact with the finger to flex the spring bar, and means for slidably moving said rod to further flex the spring bar and tilt the frame.

13. Apparatus for coating metal pails and the like including a carrier, a rod slidably connected to the carrier, a frame pivotally mounted upon the rod and adapted to carry a pail to be coated, a spring bar on the carrier operatively associated with the frame, toggle links connected to said rod, and means for operating said toggle links for slidably moving the rod to flex the spring bar and tilt the frame.

14. Apparatus for coating metal pails and the like including a carrier, a rod slidably connected to the carrier, a frame pivotally mounted upon the rod and adapted to carry a pail to be coated, a spring bar on the carrier operatively associated with the frame, toggle links connected to said rod, and a plunger for operating said toggle links for slidably moving the rod, to flex the spring bar and tilt the frame.

15. Apparatus for coating metal pails and the like including a tank of coating material, a flux box above the coating material and provided with a slot in one wall, a frame adapted to carry a pail to be coated, means for moving the frame to carry the pail through the flux box and into the coating material, a blade upon said frame adapted to pass through said slot, and a sand box for normally sealing said slot.

16. Apparatus for coating metal pails and the like including a tank of coating material, a flux box above the coating material and provided with an inclined slot in one wall, a frame adapted to carry a pail to be coated, means for moving the frame in an inclined path to carry the pail through the flux box and into the coating material, an inclined blade upon said frame adapted to pass through said slot, and a disk provided with a notch to receive said blade for normally sealing said slot.

MARTIN L. HUNKER.